United States Patent Office 2,844,969
Patented July 29, 1958

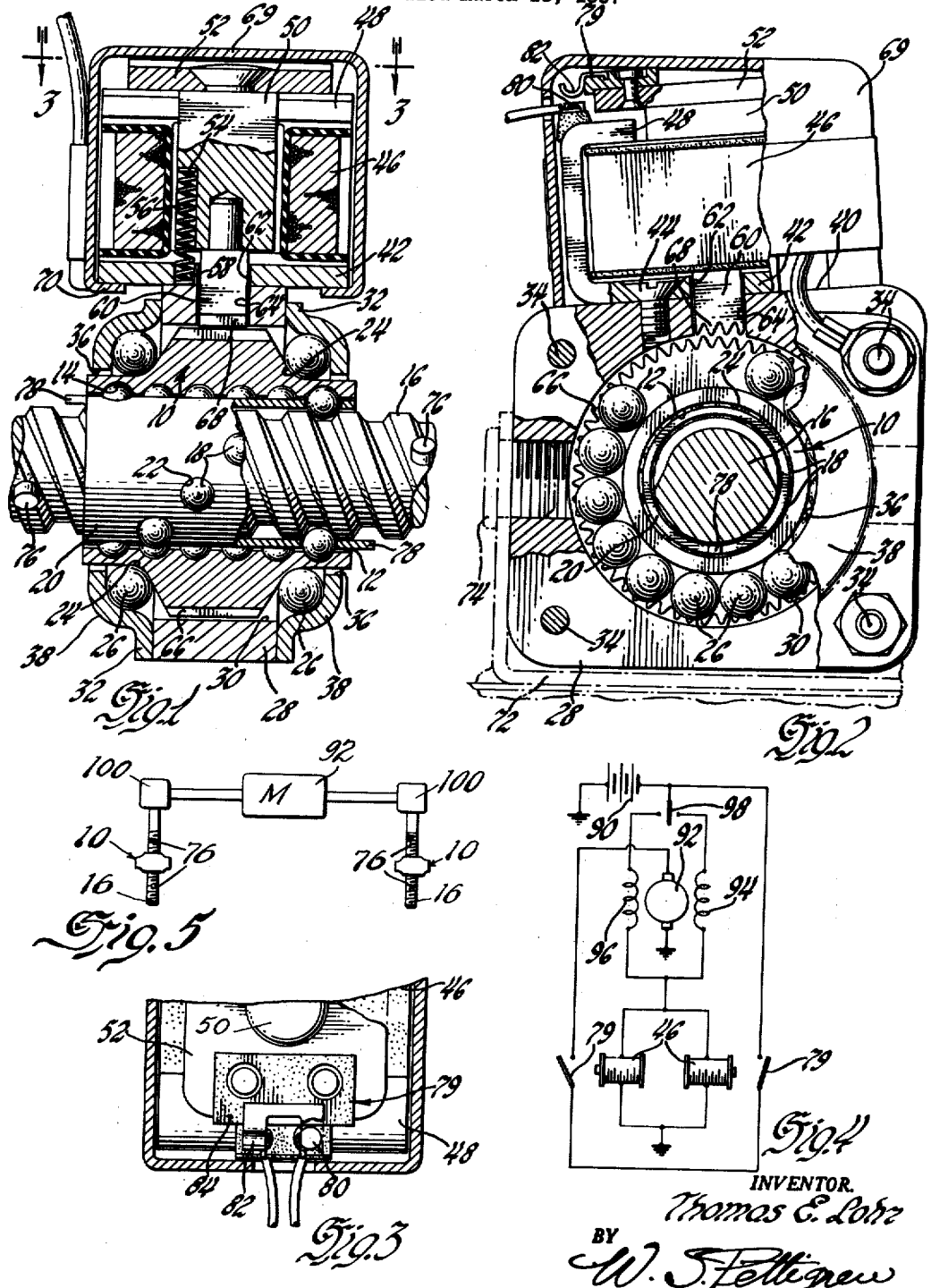

2,844,969

MECHANICAL MOVEMENT DEVICE

Thomas E. Lohr, Detroit, Mich., assignor to General Motors Corporation, Detroit, Mich., a corporation of Delaware Application March 18, 1957, Serial No. 646,810

9 Claims. (Cl. 74—424.8)

This invention relates to mechanical movement devices and more particularly to screw and nut actuators.

The screw and nut actuator of this invention is of the general type including a helically threaded lead screw and a nut threadedly connected to the lead screw and selectively secured to a non-rotatable housing so as to secure the nut against rotation and thereby cause the nut and lead screw to move axially relative to each other upon rotation of the lead screw. Screw and nut actuators of this type have many uses and are often used in power operated seat adjuster structures.

In many present actuators, the nut is rotatably received within a non-rotatable housing and a solenoid actuated plunger supported by the housing is selectively operable to impositively engage within a circumferential or axial groove in the nut to secure the nut to the housing. Since the plunger is not of the exact size of the groove, there is lost motion between the plunger and nut before the nut is securely held against rotation. In addition, in many actuators of this type, only one circumferential or axial groove is provided. Therefore, if the solenoid actuated plunger does not happen to be in alignment with the groove when the solenoid is energized, the nut may rotate through a partial revolution before being held against rotation.

In many seat adjuster structures, the seat is supported by spaced adjusters at either side thereof with each adjuster including a lead screw and one or more nuts which are threadedly connected to the lead screw to travel therealong and impart movement of the seat. Since each nut of one adjuster at one side of the seat has a corresponding nut of the other adjuster on the other side of the seat, it is desirable that the nuts be simultaneously secured to their respective housings so that each side of the seat will move through an equal distance of travel when adjusted. Otherwise, one side of the seat is likely to be displaced out of horizontal or vertical alignment with the other side of the seat. This causes undue wear of the nuts and the lead screws due to binding therebetween. As previously pointed out, many of the present nuts will either have lost motion with their solenoid actuated plungers before being positively held against rotation or the nut may rotate through a partial revolution before being positively held against rotation. Thus, if one nut on one side of the seat is positively engaged while the corresponding nut on the other side of the seat has to move through a partial revolution before being positively engaged, each side of the seat is likely to become displaced out of alignment.

The screw and nut actuator of this invention is similar to present screw and nut actuators but embodies additional features which provide many advantages over present actuators. One feature of this invention resides in the manner of selective engagement of the plunger and the nut. The periphery of the nut is provided with a continuous number of equally spaced axially directed teeth. The solenoid actuated plunger is also provided with a number of equally spaced teeth which are instantaneously and positively engageable with the teeth of the nut to secure the nut against rotation with no lost motion between the nut and plunger. In order to insure that the engagement of the teeth is instantaneous and positive with no lost motion therebetween, the teeth of the plunger move in a plane which is angular to a plane containing the axis of revolution and the teeth of the nut. Thus, it is impossible for the distal portions of the teeth on the nut and the teeth on the plunger to engage with each other, since the distal portions of the teeth on the plunger will always engage the sides of the teeth on the nut rather than engaging the distal portions of these teeth.

Another feature of this invention resides in the manner in which corresponding nuts of the spaced seat adjuster structures are interconnected to insure that both corresponding nuts are positively engaged prior to rotation of their respective lead screws regardless whether the respective lead screws are operated by only a single electric motor or by individual motors. In present seat adjuster structures, the solenoids are simultaneously energized with energization of the field and armature windings of the motor. Thus, the lead screws may start to rotate prior to positive engagement of the plungers with the nuts due to lost motion between the plungers and the nuts or due to one or both of the nuts having to complete a partial revolution prior to engagement. This problem is solved in the present invention by providing switches which are closed only when both plungers are in positive engagement with their respective nuts. The switches are in series with each other and with the control circuit controlling energization of the armature winding of either the one motor or the individual motors. Thus, both nuts must be positively engaged before the lead screws are driven.

The primary object of this invention is to provide an improved screw and nut actuator. Another object of this invention is to provide an improved screw and nut actuator which includes a power actuated plunger instantaneously and positively engageable with a nut to secure the nut against rotation without any lost motion between the plunger and nut. A further object of this invention is to provide an improved screw and nut actuator wherein the nut may be selectively secured to a non-rotatable housing by means of interfitting clutch teeth which are arranged to provide for instantaneous and positive engagement therebetween without any lost motion between the nut and the plunger. Yet another object of this invention is to provide an improved manner of coordinating spaced screw and nut actuators such that corresponding nuts of each actuator are instantaneously and positively secured against rotation prior to rotation of the respective lead screws. Yet, a further object of this invention is to provide an improved means for coordinating spaced screw and nut actuators to insure sequential operations of positively securing the nuts against rotation prior to rotation of the lead screws.

These and other objects of this invention will be readily apparent from the following specification and drawing, in which:

Figure 1 is a partial axial sectional view of a screw and nut actuator according to this invention;

Figure 2 is an axial view of the actuator of Figure 1 with parts thereof broken away for clarity of illustration;

Figure 3 is a sectional view taken on the plane indicated by line 3—3 of Figure 1;

Figure 4 is a circuit diagram; and

Figure 5 is a schematic showing of a pair of screw and nut actuators according to this invention, with the lead screws of the actuators being driven by a motor.

Referring now to the drawing, a nut 10 includes an axial bore 12 which is provided with a number of axially spaced continuous circumferential grooves 14. A helically grooved lead screw 16 is received within the axial bore of the nut and a plurality of ball bearings 18 are seated within each of the axially spaced grooves 14 and in the helical groove of the lead screw to threadedly interconnect the nut and lead screw. Cage 20 is positioned between the nut and the lead screw and includes a number of axially spaced circumferential rows of spaced openings 22 which rotatably receive ball bearings 18 and are equal in number to grooves 14. The number of openings in each axially spaced circumferential row corresponds to the number of ball bearings 18 which are received within each of the axially spaced grooves 14 of the nut. The cage retains the circumferential spacing of the ball bearings.

The nut further includes opposite continuous arcuate shoulders 24 which provide the inner race for a number of ball bearings 26. A housing 28 includes a bore 30 which receives the nut 10. Opposite covers 32 secured to the housing at 34 are provided with openings 36 for the nut and continuous grooves 38 which provide the outer race for the ball bearings 26 to rotatably support the housing 28 on the nut 10.

As may be seen particularly in Figure 2 of the drawing, the upper wall 40 of the housing 28 lies in a plane which is angular to a plane containing the axis of rotation of the nut 10 and lead screw 16 and parallel to the horizontal. A generally U-shaped bracket 42 is secured to the upper wall 40 of the housing by one or more countersunk screws 44 which are threaded into the housing. A solenoid coil 46 is mounted within bracket 42 and is retained in place by the inwardly extending opposite terminal portions 48 of the bracket. The solenoid armature 50 is slidably received within the solenoid coil and includes a flat head 52 which is engageable with the inwardly extending portions 48 of the bracket when the solenoid coil is energized to limit inward movement of the armature relative to the coil.

As may be seen particularly in Figure 1 of the drawings, a compression spring 54 received within an open groove 56 in the solenoid armature has one end thereof engaging a wall of the groove and the other end thereof engaging the upper wall 40 of the housing 28 through a bore 58 in the lower wall of bracket 42. The compression spring acts to hold the solenoid armature in its outward position as shown, whenever the solenoid coil is deenergized. A plunger 60 generally square in cross section is secured in a suitable manner to the solenoid armature 50 and is movable within generally square openings 62 and 64 in the base of the bracket 42 and housing 28, respectively, which open to the bore 30 of the housing. The outer periphery of the nut 10 is provided with a number of equally spaced axially directed teeth 66, with these teeth being continuous around the periphery of the nut. The plunger 60 is also provided with a number of equally spaced teeth 68 which are adapted to mesh with the teeth 66 in order to positively and instantaneously secure the nut to the housing 28 as will be described.

Referring now particularly to Figure 2 of the drawing, it will be noted that the teeth 68 move in a plane which is angular to a vertical plane containing the axis of rotation of the nut and the lead screw, with this plane being generally normal to the plane of the upper wall 40 of the housing. This angular displacement of the teeth 68 relative to the teeth 66 insures a positive and instantaneous engagement between the teeth 66 and 68 when the solenoid coil 46 is energized since the distal portions of the respective teeth cannot engage each other. Thus, the distal portions of teeth 68 will always engage the sides of teeth 66 and similarly the distal portions of the teeth 66 will always engage the sides of the teeth 68 when the plunger 60 is moved inwardly upon energization of the solenoid coil. Thus, there is a positive and instantaneous engagement of the teeth without any lost motion therebetween whenever the solenoid coil is energized. A cover 69 may be provided for the solenoid coil and armature and may be secured in place by bent tabs 70 engaging bracket 42.

As indicated schematically in Figure 2 of the drawing, the housing 28 may be rotatably mounted within a fixed support 72 by means of trunnions 74 which are threaded within opposite threaded bores of the housing and rotatably supported within support 72. Thus, when the lead screw rotates, as will be described, the nut, if held against rotation, will cause the lead screw to move axially relative thereto. However, if so desired, the support 72 instead of being fixed may be secured to a member to be operated such that rotation of the lead screw 16 when the nut is held against rotation will cause the nut to move axially along the lead screw and thereby operate the member to be operated.

Referring now to Figures 1 and 2 of the drawing, the operation of the actuator will be described. The plunger 60 is shown in its position when the solenoid coil 46 is deenergized so that the spring 54 holds the plunger in its outward or retracted position to hold the teeth 68 thereof out of engagement with the teeth 66 of the nut. Assuming now that the solenoid coil 46 is energized so that the solenoid armature 50 moves inwardly of the housing 28 and the teeth 66 and 68 are interengaged. Rotation of the lead screw 16 will cause the nut 10 and the housing 28 to move axially therealong if the nut is free to move axially as previously mentioned. Otherwise, the lead screw will move axially relative to the nut if the nut is stationary as indicated schematically in Figure 2 and previously described.

It will be understood that as long as the angle or pitch of the helical groove of the lead screw does not exceed the angle of friction between the balls and the lead screw and nut the drive of the lead screw will be positive with no slipping. Thus, when the nut 10 is held against rotation but is axially movable, the ball bearings 18 move along the grooves 14 of the nut and also move along the helical groove of the lead screw such that the nut and housing will move axially along the lead screw or the lead screw will move relative to the housing. As may be seen in Figure 1 of the drawing, a radially directed pin 76 may be provided to each side of the nut to limit relative axial movement of the nut and lead screw, as will now be described. The cage 20 is provided with opposite axially extending shoulders 78 which are engageable with each of the pins 76 to limit the axial travel of the nut along the lead screw or axial travel of the lead screw relative to the nut. When the shoulder 78 of the cage engages a pin 76, the cage 20 is clutched to the lead screw for simultaneous rotation therewith. Thus, the sleeve cannot rotate, and the balls 18 thereupon must move within the axially spaced grooves 14 of the nut rather than moving along the helical groove of the lead screw. Thus, relative axial movement between the nut and lead screw is stopped, although the lead screw continues to rotate.

As may be seen in Figures 2 and 3 of the drawing, a switch 79 includes a fixed switch contact 80 mounted on one of the inwardly extending portions 48 of bracket 42, with the contact being insulated from the bracket, and a movable switch contact 82 secured to an insulating block 84 which is secured to the head 52 of the solenoid armature. Thus, whenever the solenoid armature moves inwardly of the solenoid coil to its full inward terminal position, wherein the teeth 66 and 68 are engaged, the switch 79 will be closed.

Referring now to the circuit diagram of Figure 4, a battery 90 is connected between ground and the armature winding of an electric motor 92 across a pair of switches 79 in series with each other. The field windings 94 and 96 of the motor are in shunt with each other and with a pair of solenoid coils 46 which are grounded. A manually operable switch 98 is provided for energization of either of the field windings of the motor. This circuit diagram provides a control arrangement to insure that corresponding nuts of spaced lead screws 16 are coordinated so that neither lead screw will be rotated unless both corresponding nuts are fully engaged with their respective plungers. Referring now particularly to Figure 5 of the drawings, the lead screws 16 of a pair of lead screw and nut actuators according to this invention are driven by the electric motor 92 through suitable gear reduction means 100.

Assuming now that the armature of switch 98 is moved so as to energize the field winding 96 of the motor and the solenoid coils 46, the solenoid armatures 50 will be moved inwardly of the coils so as to cause the teeth 66 and 68 of the plungers and nuts to move into engagement. As soon as these teeth have moved into engagement, the switches 79 which are in series with each other will become closed to energize the armature winding of the motor so that the motor will now operate the lead screws. Thus, rotation of the lead screws is sequential relative to engagement of the solenoid plungers with the nuts such that it is impossible for either of the corresponding nuts to get out of phase with respect to each other. Movement of the armature of switch 98 to energize the other field winding 94 of the motor operates in the same manner.

Thus, this invention provides an improved screw and nut actuator which includes a power actuated plunger instantaneously and positively engageable with a nut to secure the nut against rotation without any lost motion between the plunger and the nut. The invention further provides an improved manner of coordinating spaced screw and nut actuators so that corresponding nuts of each actuator are instantaneously and positively secured against rotation prior to any rotation of the respective lead screws which are threadedly connected to the nuts.

I claim:

1. A mechanical movement device comprising, spaced pairs of first and second rotatable members, means interconnecting the members of each pair for axial movement of said first members relative to said second members upon relative rotational movement therebetween, a spaced pair of non-rotatable members, first means cooperatively interconnecting each of said non-rotatable members and said first members to secure said first members against rotation for axial movement thereof relative to said second members upon rotational movement thereof, second means for operating each of said first means, third means for rotating each of said second members, and control means responsive to operation of said second means to control operation of said third means.

2. A mechanical movement device comprising, spaced pairs of first and second rotatable members, means interconnecting the members of each pair for axial movement of said first members relative to said second members upon relative rotational movement therebetween, a spaced pair of non-rotatable members, first means selectively operable to interconnect each of said non-rotatable members and said first members to secure said first members against rotation for axial movement thereof relative to said second members upon rotational movement thereof, second means for rotating each of said second members and control means responsive to selective operation of said first means for controlling said second means.

3. A mechanical movement device comprising, a pair of lead screw members, a nut threadedly connected to each of said members for axial movement therealong upon relative rotational movement therebetween, a non-rotatable housing rotatably supported on each of said nuts, first means on said housing selectively engageable with each of said nuts to secure said nuts against rotation for axial movement along said lead screws upon rotation thereof, power operating means for operating each of said first means, power operating means for rotating said lead screws, and a control circuit responsively connected to each of said power operating means to provide for sequential operation thereof.

4. A mechanical movement device comprising, a pair of lead screw members, a nut threadedly connected to each of said members for axial movement therealong upon relative rotational movement therebetween, a non-rotatable housing rotatably supported on each of said nuts, first means on said housing selectively engageable with each of said nuts to secure said nuts against rotation for axial movement along said lead screws upon rotation thereof, power operating means for operating each of said first means, means for rotating said lead screw members, and control means responsively connected to said first means and said last mentioned means to provide sequential operation thereof.

5. A mechanical movement device comprising, a pair of lead screw members, a nut threadedly connected to each of said members for axial movement therealong upon relative rotational movement therebetween, a non-rotatable housing rotatably supported on each of said nuts, first means on said housing selectively engageable with each of said nuts to secure said nuts against rotation for axial movement along said lead screws upon rotation thereof, power operating means for operating each of said first means, second means for selectively operating each of said first means, third means for selectively rotating said lead screw members, and control means responsively connected to each of said selectively operable second means to override selective operation of said third means until selective operation of said second means.

6. A mechanical movement device comprising, first and second rotatable members, means interconnecting said members for axial movement of said first member relative to said second member upon relative rotational movement therebetween, a non-rotatable member, instantaneously and positively engageable first means for selectively interconnecting said non-rotatable member and said first member to secure said first member against rotation for axial movement thereof relative to said second member upon rotational movement thereof, and means for selectively operating said first means.

7. A mechanical movement device comprising, first and second rotatable members, means interconnecting said members for axial movement of said first member relative to said second member upon relative rotational movement therebetween, a plurality of spaced teeth on said first member, and means on said non-rotatable member including a plurality of teeth for meshing engagement with said teeth of said first member to positively secure said first member to said non-rotatable member for axial movement along said second member upon rotational movement thereof.

8. A mechanical movement device comprising, first and second rotatable members, means interconnecting said members for axial movement of said first member relative to said second member upon relative rotational movement therebetween, a non-rotatable member, instantaneously and positively engageable means for selectively clutching said first member to said non-rotatable member to secure said first member against rotation, said means including a plurality of teeth on said first member and a plurality of teeth movably supported on said non-rotatable member for engagement with said teeth on said first member to thereby positively secure said first member to said non-rotatable member, and means for selectively operating said positively engageable means.

9. A mechanical movement device comprising, a lead screw, a nut threadedly connected to said lead screw for axial movement therealong upon relative rotational movement therebetween, a non-rotatable housing rotatably supported on said nut, a plurality of continuous spaced teeth on said nut, and a power operated member movably supported on said housing and including a plurality of teeth for engagement with the teeth of said nut to thereby secure said nut to said housing for axial movement along said lead screw upon relative rotational movement therebetween, said teeth on said movable member being movable in a plane angular to a plane containing the axis of rotation of said nut and said teeth to thereby insure instantaneous meshing engagement of said teeth without engagement of the distal portions thereof.

References Cited in the file of this patent

UNITED STATES PATENTS

| | | |
|---|---|---|
| 534,180 | Smart et al. | Feb. 12, 1895 |
| 1,268,264 | Murray | June 4, 1918 |
| 1,276,811 | Ragan | Aug. 27, 1918 |
| 2,182,452 | Rose | Dec. 5, 1939 |
| 2,363,021 | Steele | Nov. 21, 1944 |
| 2,477,701 | McCallum | Aug. 2, 1949 |
| 2,644,120 | Swanton | June 30, 1953 |
| 2,662,418 | Flinn | Dec. 15, 1953 |
| 2,743,623 | Wells | May 1, 1956 |
| 2,768,532 | Russell | Oct. 30, 1956 |

UNITED STATES PATENT OFFICE
CERTIFICATE OF CORRECTION

Patent No. 2,844,969                                      July 29, 1958

Thomas E. Lohr

It is hereby certified that error appears in the printed specification of the above numbered patent requiring correction and that the said Letters Patent should read as corrected below.

Column 2, line 35, for "an-" read -- an --; line 44, for "clutch" read -- clutching --; column 7, line 11, beginning with "References Cited in the file of this patent", strike out all to and including "2,768,532 Russell - - - Oct. 30, 1956", in column 8, line 9.

Signed and sealed this 17th day of February 1959.

(SEAL)
Attest:

KARL H. AXLINE                                        ROBERT C. WATSON
Attesting Officer                                    Commissioner of Patents